(12) United States Patent
Chen et al.

(10) Patent No.: US 7,693,279 B2
(45) Date of Patent: Apr. 6, 2010

(54) SECURITY METHOD AND APPARATUS USING BIOMETRIC DATA

(75) Inventors: Liqun Chen, Bradley Stoke Bristol (GB); Keith Alexander Harrison, Monmouthshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1382 days.

(21) Appl. No.: 10/829,930

(22) Filed: Apr. 21, 2004

(65) Prior Publication Data

US 2005/0005135 A1    Jan. 6, 2005

(30) Foreign Application Priority Data

Apr. 23, 2003 (GB) ................... 0309182.4
May 22, 2003 (GB) ................... 0311724.9

(51) Int. Cl.
*H04L 9/00* (2006.01)
*H04K 1/00* (2006.01)

(52) U.S. Cl. ......................... 380/44; 713/186
(58) Field of Classification Search ............... 713/186
See application file for complete search history.

(56) References Cited

U.S. PATENT DOCUMENTS

| | | | |
|---|---|---|---|
| 4,799,061 A | 1/1989 | Abraham et al. | 340/5.26 |
| 4,956,863 A | 9/1990 | Goss | 380/30 |
| 4,993,068 A | 2/1991 | Piosenka et al. | 380/23 |
| 5,272,754 A | 12/1993 | Boebert | 713/159 |
| 5,475,756 A | 12/1995 | Merritt | 705/73 |
| 5,530,758 A | 6/1996 | Marino et al. | 713/150 |
| 5,680,460 A * | 10/1997 | Tomko et al. | 713/186 |
| 5,841,868 A | 11/1998 | Helbig | 235/380 |
| 5,940,510 A | 8/1999 | Curry et al. | 705/65 |
| 6,035,398 A * | 3/2000 | Bjorn | 713/186 |
| 6,088,450 A | 7/2000 | Davis et al. | 713/182 |
| 6,138,239 A | 10/2000 | Veil | 726/10 |
| 6,161,180 A | 12/2000 | Matyas et al. | 713/169 |
| 6,185,678 B1 | 2/2001 | Arbaugh et al. | 713/2 |
| 6,192,473 B1 | 2/2001 | Ryan et al. | 713/168 |
| 6,263,431 B1 | 7/2001 | Lovelace et al. | 713/2 |
| 6,275,936 B1 | 8/2001 | Kyojima et al. | 713/182 |
| 6,360,321 B1 | 3/2002 | Gresel et al. | 713/172 |
| 6,367,016 B1 * | 4/2002 | Lambert et al. | 713/185 |
| 6,463,535 B1 | 10/2002 | Drews | 713/2 |
| 6,510,236 B1 | 1/2003 | Crane et al. | 382/116 |
| 6,557,104 B2 | 4/2003 | Vu et al. | 713/189 |
| 6,560,706 B1 | 5/2003 | Carbajal et al. | 713/155 |
| 6,609,199 B1 | 8/2003 | DeTreville | 713/172 |
| 6,678,821 B1 * | 1/2004 | Waugh et al. | 713/168 |
| 6,687,375 B1 * | 2/2004 | Matyas et al. | 380/45 |
| 6,694,436 B1 | 2/2004 | Audebert | 726/9 |
| 6,711,675 B1 | 3/2004 | Spiegel et al. | 713/2 |
| 6,748,538 B1 | 6/2004 | Chan et al. | 726/26 |
| 6,826,690 B1 | 11/2004 | Hind et al. | 713/186 |
| 6,892,301 B1 | 5/2005 | Hansmann et al. | 713/172 |
| 6,928,163 B1 * | 8/2005 | Matyas et al. | 380/30 |
| 6,931,528 B1 | 8/2005 | Immonen | 713/151 |
| 6,940,976 B1 * | 9/2005 | Matyas et al. | 380/44 |
| 6,957,339 B2 * | 10/2005 | Shinzaki | 713/186 |
| 6,988,250 B1 | 1/2006 | Proudler et al. | 716/1 |
| 7,096,204 B1 | 8/2006 | Chen et al. | 705/74 |
| 7,113,594 B2 * | 9/2006 | Boneh et al. | 380/28 |
| 7,178,025 B2 * | 2/2007 | Scheidt et al. | 713/168 |
| 7,194,623 B1 | 3/2007 | Proudler et al. | 713/164 |
| 2002/0013898 A1 * | 1/2002 | Sudia et al. | 713/155 |
| 2002/0023032 A1 | 2/2002 | Pearson et al. | 705/35 |
| 2002/0026576 A1 | 2/2002 | Das-Purkuyashta et al. | 713/156 |
| 2003/0041250 A1 | 2/2003 | Proudler | 713/182 |
| 2003/0046542 A1 | 3/2003 | Chen et al. | 713/176 |
| 2003/0219121 A1 * | 11/2003 | van Someren | 380/44 |

FOREIGN PATENT DOCUMENTS

| | | | |
|---|---|---|---|
| GB | 2 370 470 A | | 6/2002 |
| GB | 2370471 | * | 6/2002 |
| WO | 96/36934 | | 11/1996 |
| WO | 98/50875 A2 | | 11/1998 |
| WO | 98/55912 | | 12/1998 |
| WO | 00/00882 | | 1/2000 |

(Continued)

OTHER PUBLICATIONS

Boneh, D. and M. Franklin, "Identity-Based Encryption from the Weil Pairing," *Advances in Cryptology—CRYPTO 2001*, LNCS 2139, pp. 213-229, Springer-Verlag (2001).

(Continued)

*Primary Examiner*—Christian LaForgia

(57) ABSTRACT

A security method and apparatus is provided in which a trusted authority is arranged to read in identity data from a memory device presented by an individual. This identity data comprises both biometric data of a specific individual, and additional identity data concerning the same individual. The trusted authority uses the biometric data as a biometric reference for comparison with biometric characteristics of the individual presenting the memory card in order to determine whether the latter is the individual represented by the biometric data. The trusted authority uses the additional identity data or matching data, together with private data of the trusted authority, to generate a decryption key. This decryption key is apt to decrypt data encrypted using both an encryption key string comprising the additional identity data of the specific individual and public data of the trusted authority.

36 Claims, 3 Drawing Sheets

FOREIGN PATENT DOCUMENTS

| WO | 0127723 | 4/2001 |
|---|---|---|
| WO | 02/073877 A2 | 9/2002 |
| WO | 03/017559 A2 | 2/2003 |

OTHER PUBLICATIONS

Boneh, D., et al., "Identity-Based Mediated RSA," *3rd Workshop on Information Security Application*, Jeju Island, Korea, 12 pages (Aug. 2002).

Chen, L., et al., "Certification of Public Keys Within an Identity Based System," *Proceedings of Information Security Conference 2002*, ed. A.H. Chan and V. Gligor, LNCS 2433, pp. 322-333, Springer-Verlag (2002).

Chen, Pearson, and Vamvakas, "A Trusted Biometric System," HP Laboratories Bristol, Filton Road, Stoke Gifford, Bristol, BS34 8QZ, UK, pp. 1-12 (Jul. 2002).

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

TCPA Trusted Computing Platform Alliance Main Specification v1.1, www.trustedcomputing.org., Trusted computing platforms—tcpa technology in context; Pearson; Pretice Hall; ISBN 0-13-009220-7, pp. 1-70, (2001).

U. S. Appl. No. 10/829,931, filed Apr. 21, 2004, Chen et al.

Peyravian, M., et al., "Generation of RSA Keys That Are Guaranteed to be Unique for Each User," *Computers & Security*, Elsevier Science Limited, vol. 19, No. 3, pp. 282-288 (2000).

Anderson, R., et al., "Tamper Resistance—A Cautionary note," ISENIX Association, Second USENIX workshop on Electronic Commerce, pp. 1-11 (Nov. 18-21, 1996).

"Building a foundation of trust in the PC," Trusted computing Platform Alliance, pp. 1-7 (Jan. 2000).

"Information Technology-Security techniques-Entity Authentication—Part 3: Mechanisms using digital signature techniques," ISO/IEC 9798-3, 6 pages (1998).

Davida, G.I., et al., "On Enabling Secure Applications Through Off-Line Biometric Identification," IEEE, pp. 148-157 (1998).

Thomasson, J.-P., et al., "Smartcards: Portable Security," 2nd Annual IEEE International Conference.

Intel, "Wired for Management Baseline specification v2.0," Boot Integrity Services Application Programming Interface Version 1.0, 64 pages (Dec. 28, 1998).

"Information technology-Security Techniques-Key management-Part 3: Mechanisms using asymetric techniques," ISO/IEC 11770-3, pp. 1-23 and Annexus A-D (1999).

Trusted Computing Platform Alliance, Main Specification Version 1.0, 284 pages (Jan. 25, 2001).

Mont, M., et al., "A flexible Role-based Secure Messaging Service: Exploiting IBE Technology in a Health Care Trial," Trusted Systems Laboratory, HP Laboratories Bristol, pp. 1-17 (Feb. 2003).

* cited by examiner

SECURITY METHOD AND APPARATUS USING BIOMETRIC DATA

RELATED APPLICATIONS

The subject matter of the present application is related to the disclosures of U.S. patent application Ser. No. 10/110279 filed Jul. 12, 2002 and Ser. No. 10/829,931 filed Apr. 21, 2004.

1. Field of the Invention

The present invention relates to security methods and apparatuses using biometric data; in particular, the present invention relates to such methods and apparatuses that utilise identifier-based encryption/decryption and analogous techniques.

As used herein, the term "biometric data" means any digital data, however measured or recorded, that represents characteristics of a biological individual intended to be unique to that individual. Thus, both digital image data of a human face and digital fingerprint data are examples of biometric data.

2. Background of the Invention

The use of biometric data for authenticating individuals is well known. It is also known to use biometric authentication techniques in relation to memory-based identity cards—for example, such a card can carry fingerprint data concerning the card owner, this data being used to check whether a person presenting the card is the card owner by comparing the data from the card with that generated by a local fingerprint reader. Of course, the biometric data on such a card has to be trustable; more particularly, the card should have the properties of trustworthiness and unforgeability. Trustworthiness means that any information stored in the card must be issued by a trusted authority (that is, an authority trusted by the party relying on the authenticity of the stored biometric data). Unforgeability means that any information stored in the card cannot be modified by an unauthorized entity without being detected (a typical, but not the only, example of a suitable form of card would be one using a write-once memory chip).

As well as biometric data, memory-based identity cards usually include other, non-biometric, identity data such as a unique serial number allocated by the card issuer and personal profile data that may include date birth, home address, nationality, etc. For cards with the properties of trustworthiness and unforgeability, this additional data is effectively intimately linked with the biometric data in the sense that neither the biometric or non-biometric data can be changed by an unauthorised entity without being detected and neither changes often, if at all.

It is an object of the present invention to provide improved security methods based on identity data, such methods being usable in relation to memory-based cards such as identity or entitlement cards.

The present invention is in part based on the appreciation that Identifier-Based Encryption (IBE) has certain properties than can be adapted for use in memory-card based security systems and other applications.

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 based on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographhically-prejudicial encryption key string. In applications where defence against such attacks is not important, it would be possible to omit this processing of the string.

Frequently, the encryption key string serves to "identify" the intended message recipient and this has given rise to the use of the label "identifier-based" or "identity-based" generally for cryptographic methods of the type under discussion. However, depending on the application to which such a cryptographic method is put, the string may serve a different purpose to that of identifying the intended recipient and, indeed, may be an arbitrary string having no other purpose than to form the basis of the cryptographic processes. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string".

A number of IBE algorithms are known and FIG. 2 indicates, for three such algorithms, the following features, namely:

the form of the encryption parameters used, that is, the encryption key string and the public data of the trusted authority (TA);

the conversion process applied to the encryption key string to prevent attacks based on judicious selection of this string;

the primary encryption computation effected;

the form of the encrypted output.

The three prior art IBE algorithms to which FIG. 2 relates are:

Quadratic Residuosity (QR) method as described in the paper: C. Cocks, "An identity based encryption scheme based on quadratic residues", Proceedings of the 8$^{th}$ IMA International Conference on Cryptography and Coding, LNCS 2260, pp 360-363, Springer-Verlag, 2001. A brief description of this form of IBE is given hereinafter.

Bilinear Mappings pusing, for example, a modified Tate pairing t or modified Weil pairing e for which:

$$\mathbf{p}: G_1 \times G_1 \to G_2$$

where $G_1$ and $G_2$ denote two algebraic groups of prime order q and $G_2$ is a subgroup of a multiplicative group of a finite field. For the Tate pairing an asymmetric form is also possible:

$$\mathbf{p}: G_1 \times G_0 \to G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using modified Weil pairings is given in the paper: D. Boneh, M. Franklin—"Identity-based Encryption from the Weil Pairing" in *Advances in Cryptology—CRYPTO 2001*, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, August, 2002.

A more detailed description of the QR method is given below with reference to the entities depicted in FIG. 1 and using the same notation as given for this method in FIG. 2. In the QR method, the trust authority's public data 15 comprises a value N that is a product of two random prime numbers p and q, where the values of p and q are the private data 17 of the trust authority 12. The values of p and q should ideally be in the range of $2^{511}$ and $2^{512}$ and should both satisfy the equation: p, q≡3mod 4. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range [0, $2^N$]) until a value of $t_+$ is found that satisfies the equation jacobi($t_+$,N)=m', where m' has a value of −1 or 1 depending on whether the corresponding bit of the user's data is 0 or 1 respectively. (As is well known, the jacobi function is such that where $x^2 \equiv$ #mod N the jacobi (#, N)=−1 if x does not exist, and =1 if x does exist). The data provider 10 then computes the value:

$$s_+ = (t_+ + K/t_+) \mod N$$

where: $s_+$ corresponds to the encrypted value of the bit m' concerned, and $$K = \#(\text{encryption key string})$$

Since K may be non-square, the data provider additionally generates additional random numbers $t_-$ (integers in the range [0, $2^N$)) until one is found that satisfies the equation jacobi($t_-$,N)=m'. The data provider 10 then computes the value:

$$s_- = (t_- - K/t_-) \mod N$$

as the encrypted value of the bit m concerned.

The encrypted values $s_+$ and $s_-$ for each bit m' of the user's data are then made available to the intended recipient 11, for example via e-mail or by being placed in a electronic public area; the identity of the trust authority 12 and the encryption key string 14 will generally also be made available in the same way.

The encryption key string 14 is passed to the trust authority 12 by any suitable means; for example, the recipient 11 may pass it to the trust authority or some other route is used—indeed, the trust authority may have initially provided the encryption key string. The trust authority 12 determines the associated private key B by solving the equation:

$$B^2 \equiv K \mod N \quad \text{("positive" solution)}$$

If a value of B does not exist, then there is a value of B that is satisfied by the equation:

$$B^2 \equiv -K \mod N \quad \text{("negative" solution)}$$

As N is a product of two prime numbers p, q it would be extremely difficult for any one to calculate the decryption key B with only knowledge of the encryption key string and N.

However, as the trust authority 12 has knowledge of p and q (i.e. two prime numbers) it is relatively straightforward for the trust authority. 12 to calculate B.

Any change to the encryption key string 14 will result in a decryption key 16 that will not decrypt the payload data 13 correctly. Therefore, the intended recipient 11 cannot alter the encryption key string before supplying it to the trust authority 12.

The trust authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

$$m' = \text{jacobi}(s_+ + 2B, N)$$

If the "negative" solution for the decryption key B has been provided, the recipient 11 recovers each bit m' using:

$$m' = \text{jacobi}(s_- + 2B, N)$$

SUMMARY OF THE INVENTION

According to one aspect of the present invention, there is provided a security method, carried out by a trusted authority, comprising reading identity data from a memory device presented by a subject individual, the identity data comprising both biometric data of a specific individual and additional identity data concerning the same specific individual;

using the biometric data read from the memory device as a biometric reference for comparison with biometric characteristics of said subject individual to determine whether the latter is said specific individual; and generating a decryption key using private data of the trusted authority and at least the additional data read from the memory device or matching data.

The present invention also envisages apparatus and a computer program product for implementing the foregoing security method of the invention.

According to another aspect of the present invention, there provided a data access control method comprising:

(a) encrypting first data using as encryption parameters both public data of a trusted authority, and an encryption key string formed using at least non-biometric data indicative of a specific individual;

(b) providing identity data to the trusted authority by reading it from a memory device presented by a subject individual, the identity data comprising both the said non-biometric data indicative of said specific individual and biometric data of the same individual, the trusted authority:

using the biometric data read from the memory device as a biometric reference for comparison with biometric characteristics of said subject individual to determine whether the latter is said specific individual, and generating a decryption key using at least the non-biometric data read from the memory device and private data of the trusted authority, said public data being related to this private data;

(c) using the decryption key to decrypt the encrypted first data.

The present invention also envisages a system for implementing the foregoing data access control method of the invention.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

FIGS. 2A and 2B together illustrate a system comprising: a data encryptor entity 20 for encrypting data D using an encryption key string $K_{ENC}$ and public data of a trusted authority; a trusted authority entity 40 for generating a decryption key $K_{DEC}$ using the encryption key string $K_{ENC}$ and private data of the trusted authority, the public data being data generated by the entity 40 from the private data; and a data decryptor entity 30 for using the decryption key $K_{DEC}$ and the public data to decrypt the encrypted data D. The entities 20, 30 and 40 are typically-based around general-purpose processors executing stored programs but may include dedicated cryptographic hardware modules; furthermore, as will be discussed below, certain functions of the trusted authority may be carried out by human operators. The computing entities 20, 30 and 40 inter-communicate as needed via, for example, the internet or other network, or by the transfer of data using portable storage devices; it is also possible that at least some of the entities actually reside on the same computing platform. Indeed, in certain embodiments the data decryptor entity 30 may be incorporated into the trusted authority entity 40 whilst in other embodiments the data encryptor entity 20 and the data decryptor entity 30 may be associated with the same individual and be provided by the same computing device.

Figure 1:
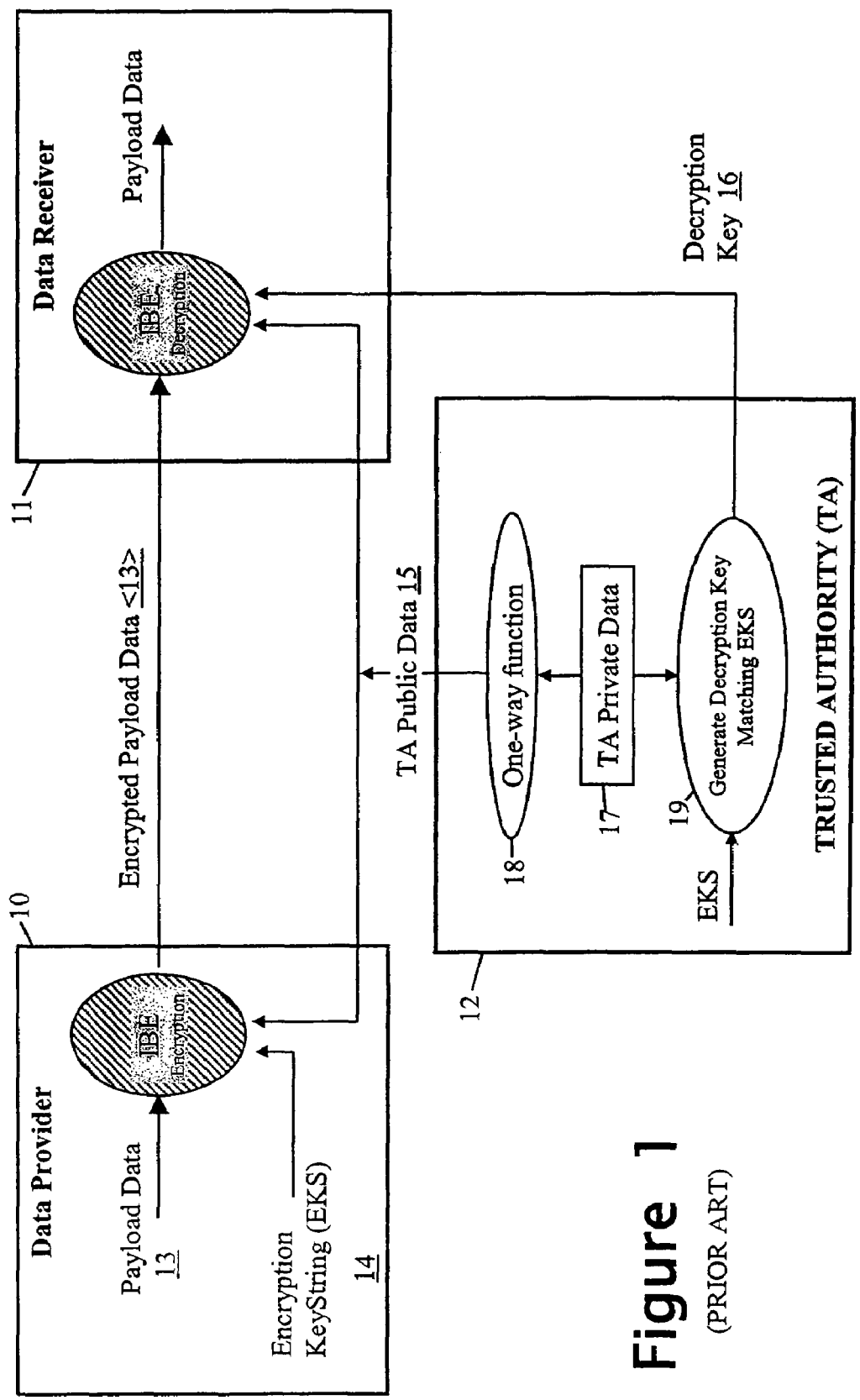
FIG. 1 is a diagram illustrating the operation of a prior art encryption schema known as Identifier-Based Encryption.

The system employs Identifier-Based Encryption with the entities 20, 30 and 40 having, in respect of IBE encryption/decryption processes, the roles of the data provider 10, data recipient 11 and trusted authority 12 of the FIG. 1 IBE arrangement. The IBE algorithm used is, for example, the QR algorithm described above with respect to FIG. 1 with the private data of the trusted authority being random prime numbers p,q and the corresponding public data being number N.

Figure 3A:
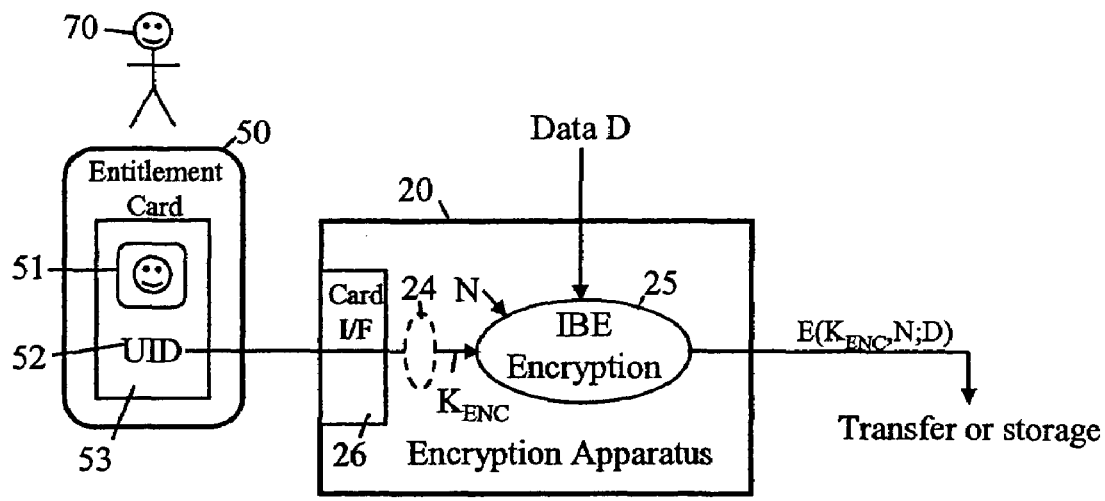
FIG. 3A is a diagram of a data encryption stage of a system embodying the invention.

The system is arranged to operate on the basis of identity data of individuals. More particularly, individuals are provided with memory cards for holding their identity data, FIG. 3A showing one such card 50 belonging to an individual 70. The memory card 52 preferably has the aforesaid properties of trustworthiness and unforgeability and may be implemented, for example, as a memory chip 53 incorporated into a base card medium.

Figure 2:
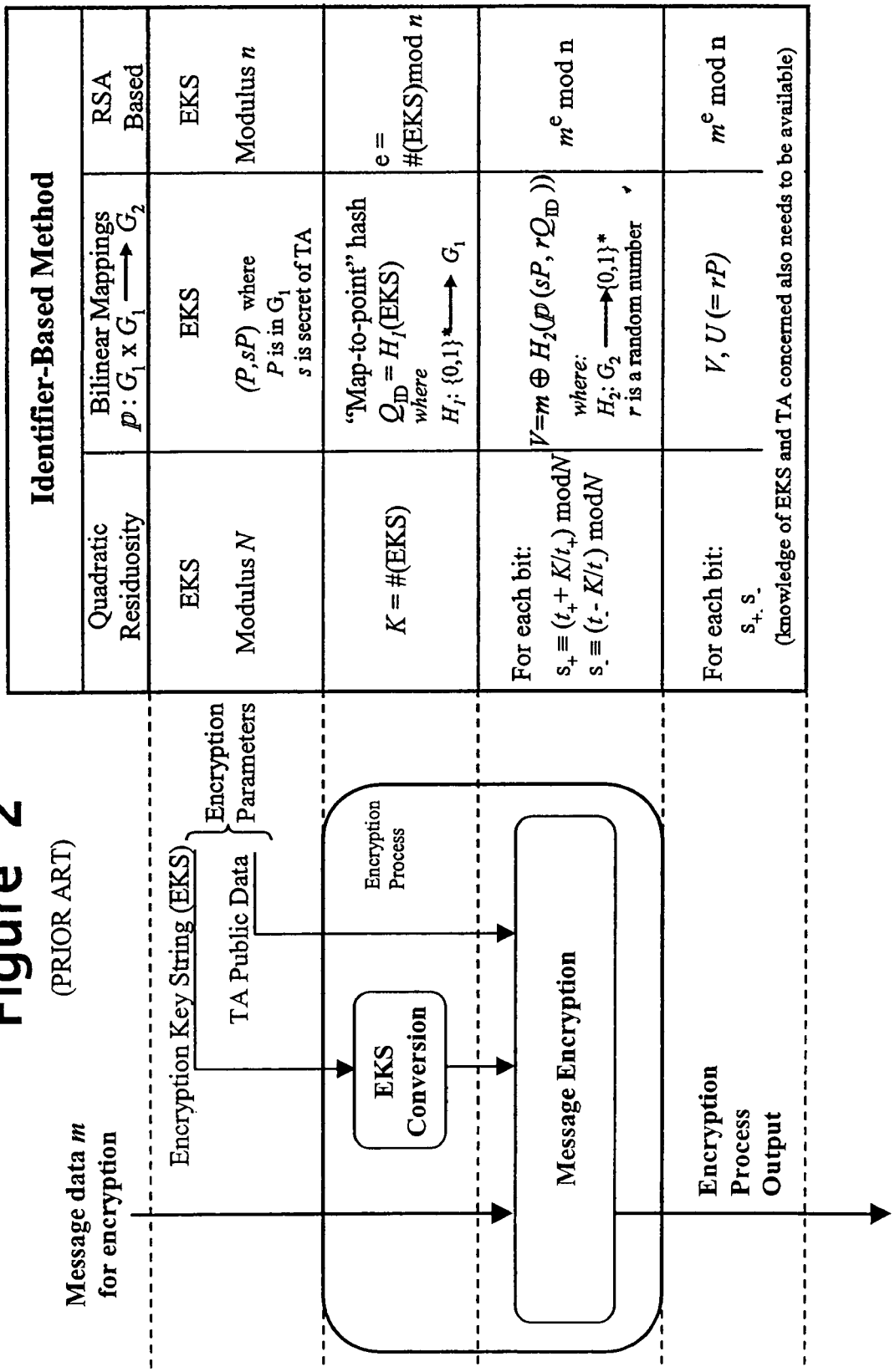
FIG. 2 is a diagram illustrating how certain IBE operations are implemented by three different prior art IBE methods.

The identity data stored on the memory card comprises both biometric data 51 and non-biometric data 52. The biometric data 51 is represented in FIG. 2 by a face icon but can be any type of biometric data and is not limited to a facial image; possible types of biometric data include image data, fingerprint data, retina scan data etc. Similarly, the non-biometric data is represented in FIG. 3A by a Universal Identity UID (such as a reference number unique to the individual) but may be any other suitable non-biometric identity data. The biometric and non-biometric identity data stored on a card 50 is specific to the individual to whom the card has been issued (the card "owner" regardless who may currently have possession of the card).

Considering first the operation of the encryptor entity 20, the non-biometric data 52 of an individual (the specific individual 70 in FIG. 3A) is provided in digital form to the encryptor entity 20 by being read from the card 50 owned by the individual 70 using a card reader 26.

The non-biometric data 52 is used by the entity 20 to form the encryption key string $K_{ENC}$, the non-biometric data 52 either being used directly as the key or after processing (see dashed operation oval 24) such as by concatenation with other data The encryption key string $K_{ENC}$ is then used to encrypt data D to form encrypted data $E(K_{ENC},N;D)$ where $E(0)$ indicates that the elements appearing before the semi-colon inside the brackets are used to IBE encrypt the element appearing after the semi-colon. The encrypted data is then either stored to a storage medium (which could be the card 50 itself) for eventual transfer to the decryptor entity 30, or sent over a communications link directly or indirectly to the decryptor entity 30.

Figure 3B:
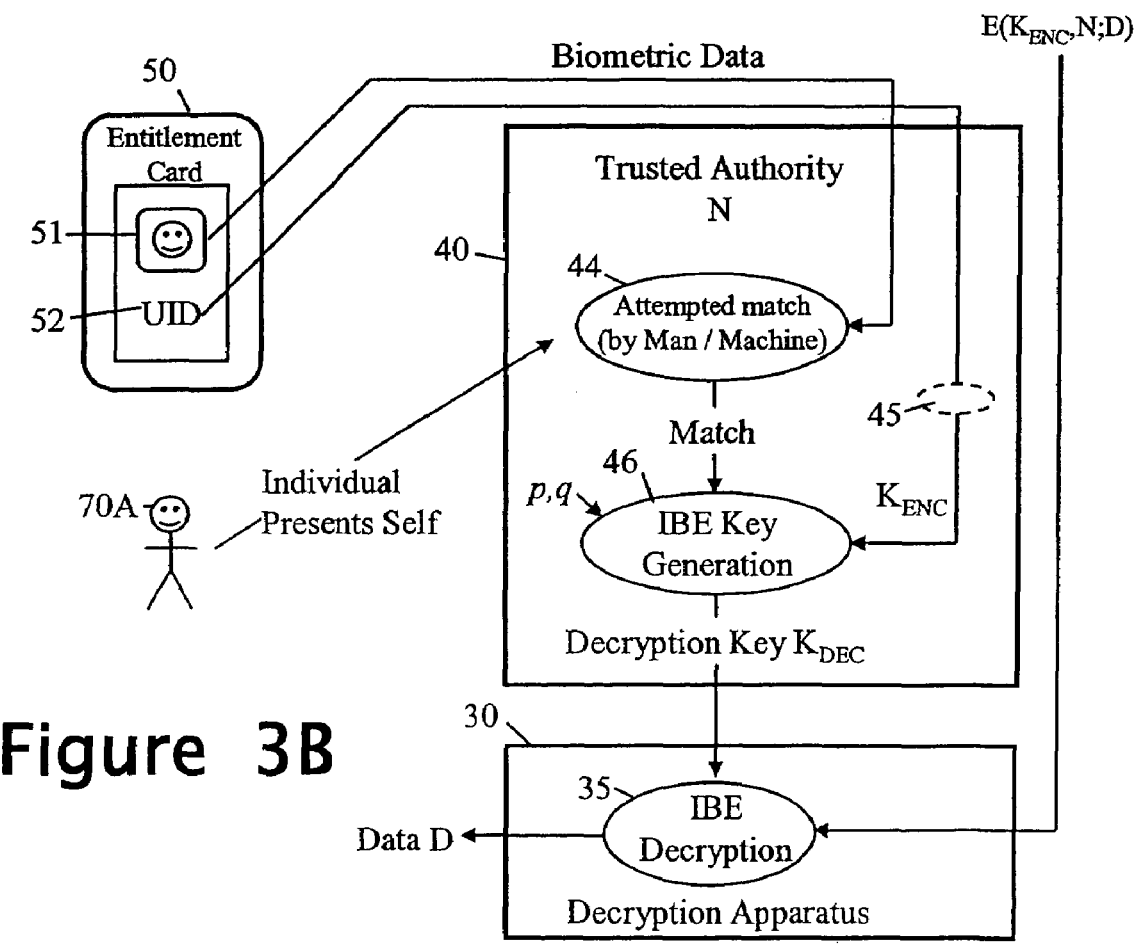
FIG. 3B is a diagram of key generation and decryption stages of the system whose encryption stage is illustrated in FIG. 3A.

When an individual 70A (see FIG. 3B) who may or may not be the same as the individual 70, wishes to access the encrypted data $E(K_{ENC},N;D)$ this individual presents themselves to the trusted authority entity 40 together with a memory card from which the trusted authority reads off the biometric and non-biometric identity data 51, 52. The presented memory card may or may not be the same one as presented to the encryptor entity 20 so that the non-biometric data received by the trusted authority may or may not be that used in the encryption key string $K_{ENC}$.

Consider first the situation (illustrated in FIG. 3B) in which the memory card 50 presented to the trusted authority 40 is the same as that presented to the encryptor entity 20. The trusted authority entity first uses the biometric data 51 as a biometric reference for comparison with biometric characteristics of the individual 70A to determine whether the latter is the individual 70 who owns the card 50 (see operation oval 44). As is well known to persons skilled in the art, this comparison and determination may be carried out automatically by comparing features represented in the reference biometric data 51 with features in measurement data produced by measurement of the subject individual 70A using suitable sensors (not illustrated). However, particularly where the biometric data comprises facial image data, a human operator can be presented with the biometric reference data (for example, as an image of a face where the biometric data is facial image data) and judge whether the present individual 70A is the same as that represented by the biometric data.

If no match is found between the individual 70A and that represented by the biometric data 51, the trusted authority 40 refuses to proceed with the generation of the decryption key $K_{DEC}$ needed to access the encrypted data. However, if a match is found in operation 44, the trusted authority proceeds.

Where the non-biometric data 52 does not constitute the encryption key string $K_{ENC}$ in its entirety, the next operation is to re-form the encryption key string (see dashed operation oval 45)—this may involve the concatenation of the non-biometric identity data 52 with other data known to both the entities 20 and 40. For example, this other data may simply be an item of non-confidential data or it may be a shared secret; this other data may vary between encryption operations of the entity 20.

Once the encryption key string has been obtained, the trusted authority uses it, along with its private data p,q, to generate the decryption key $K_{DEC}$ (see operation oval 46).

The decryption key $K_{DEC}$ is then transferred to the data decryptor entity 30 to which the encrypted data $E(K_{ENC},N;D)$ is also supplied. The transfer of the decryption key to the entity 30 from the entity 40 may be effected over a communications link or via a data storage device; as already indicated, in certain embodiments, the decryption entity 30 is actually part of the trusted authority so no transfer is required. The decryption key $K_{DEC}$ is thereafter used to decrypt the encrypted data to recover the data D in clear (operation 35). Where the decryption is effected by the trusted party entity 40, the recovered data D is typically then provided to the individual 70A (now known to be the individual 70) either by displaying it or by the transfer of an electronic or paper copy to the individual; however, the trusted authority may decide not to disclose the data D.

It will be appreciated that the trusted authority can carry out the key generation operation 46 in parallel with, or even before, having determined that the individual 70A is the individual 70—what is important is that the entity 40 does not provide the decryption key (or where it also effects the decryption operation 35, the recovered data D) to the individual 70A until the latter is determined to be the individual 70.

The foregoing description of the operation of the trusted authority entity 40 was for the situation of the memory card presented to the entity 40 was the same as the one presented to the encryptor entity 20 so that the trusted authority received the same non-biometric data 52 as was used in the encryption key string $K_{ENC}$. If the memory card presented to the entity is different from that presented to the encryptor entity 20 (for example, it is the card owned by individual 70A who is different to the individual 70), then even though the trusted authority may generate a decryption key, this key will not serve to decrypt the encrypted data $E(K_{ENC},N;D)$. This is because whilst the biometric data read from the presented card may validate the presenter, the associated non-biometric data that is used to generate the decryption key is not that used by the encryptor entity in the encryption key string $K_{ENC}$.

The system of FIGS. 2A and 2B can be used to support a variety of applications. For example, the card 50 of the individual 70 can be used to securely store all the many passwords that the individual uses. In this case, the card's memory 53 comprises both a write-once first portion holding the biometric and non-biometric data 51, 52, and a re-writable second portion. The individual 70 presents their memory card 50 to the encryptor entity 20 and inputs his/her passwords as the data D. The entity 20 reads the non-biometric data 50 from the card 50, forms the encryption key string $K_{ENC}$, encrypts the passwords and writes the encrypted data to the rewritable portion of the memory card 50. The individual 70 now has their passwords safely stored in their memory card 52. The entity 20 can be provided by a computer or other device under the control of the individual or can be provided by the trusted authority.

Should the individual 70 forget any of their passwords, he/she goes to the trusted authority and presents their memory card 50. The biometric and non-biometric data 51, 52 are read off this card by the trusted authority entity and the biometric data is used in operation 44 to check that the individual presenting the memory card 50 is the owner of the card. Assuming that the check 44 is passed, the decryptions key $K_{DEC}$ is generated and used by the trusted authority entity to decrypt the password data D held on the card; this password data is then displayed or otherwise output to the individual 70.

The individual can choose any party as a trusted authority provided the latter can be tested to keep the private data (p,q) confidential and not to retain copies of the decrypted passwords. Another possible trusted authority would be a trusted computing platform having functionality such as specified, for example, in "TCPA—Trusted Computing Platform Alliance Main Specification v1.1" *www.trustedcomputing.org*, 2001 and described in the book "trusted computing platforms—tcpa technology in context"; Pearson (editor); Prentice Hall; ISBN 0-13-009220-7".

In another application of the FIG. 2 system, an individual wishing to store sensitive data D (such as their medical records) from a data provider presents his/her memory card to the data provider. The data provider first reads off the biometric data 51 to confirm that this data corresponds to the individual present. Assuming this is the case, the data provider uses the non-biometric data 52 from the memory card to form an encryption key string which it then uses to encrypt the data D. The encrypted data is then stored on the card 50. If at any time in the future, access is required to the sensitive data, the trusted authority reads off the biometric and non-biometric data from the memory card 50 and confirms that the card belongs to the individual concerned before generating the decryption key (and possibly decrypting the encrypted data D). In this application, one would normally require some consensual act by the card owner (such as presentation of the card to the trusted authority); however, in an emergency situation the trusted authority maybe allowed to access the data D—as might be needed where the individual has had a road traffic accident and the attending medical staff need urgently to access the medical record data D recorded on the card (in this case, the trusted authority would be the emergency services).

Many variants are possible to the above-described embodiment. For example, the non-biometric data provided to the encryptor entity 40 need not necessarily be read off directly the memory card 50 and could be provided from a common source or indirectly from the card (for example, by being read out aloud over the telephone where the non-biometric data is a reference number printed on the card as well as stored in memory).

The non-biometric data 52 can be provided by the encryptor entity along with the encrypted data and then stripped off and provided to the trusted authority. However, in this, case, the non-biometric data received in this way must be matched with that stored on the memory card presented to the trusted authority in order to ensure that there is a link between the biometric data 51 read from the card and used in operation 44 and the non-biometric data 51 used in the operation 46. In this case, the non-biometric data used for key generation can be considered to be the non-biometric data read from the memory card 50. It may be noted that where the encryption key string $K_{ENC}$ includes data additional to the non-biometric data 51, there may be some benefit in providing the encryption key string along with the encrypted data and then providing this key to the trusted authority since in this case the encryption key string does not have to be reformed in operation 45.

The further data included n the encryption key string $K_{ENC}$ may, for example, be conditions placed by the data provider on the release of the data D, these conditions being checked by the trusted authority before generation of the decryption key and/or release of the decryption key/the decrypted data.

It will be appreciated that instead of the QR IBE method, the above-described embodiments can be implemented using any other suitable IBE algorithm, such as those mentioned above that use of Weil or Tate pairings, or are RSA based; analogous cryptographic algorithms can also be used.

The storage device used to hold the identity data 51 and 52 need not be a memory card and can be any other suitable form of memory device, preferably with the aforesaid properties of trustworthiness and unforgeability.

Although not preferred, rather than using non-biometric identity data 52 in forming the encryption key string $K_{ENC}$, a further item of biometric data (additional to the data 51 used for authentication in operation 44) could, instead, be used in forming the encryption key string $K_{ENC}$.

Whilst in the foregoing example the identity data has concerned human individuals, the biometric data can alternatively be that of another type of biological organism such as a dog or horse.

Furthermore, although in the described examples the individuals have presented themselves to the trusted authority, the trusted authority or a party associated with it may be more pro-active and approach or otherwise select an individual (for example, a customs officer may select a traveller at an airport and ask to see their identity card which is a memory card with identity data).

The trusted authority may be distributed in nature having, for example, a remote station at which an individual presents themselves for biometric measurement and for their memory card to be read, and a central station where biometric data is compared and decryption key generation is carried out.

It is possible to require the involvement of multiple trust-authority entities effectively forming a compound trust authority. This may be desirable where a single authority is not trusted to be entirely reliable. One way of achieving this would be for the data encryptor to recursively encrypt the data D, with each iteration being done using the same encryption key string but the public data of a different trusted authority—the individual must then go to several trust authorities in turn to successively roll back each encryption iteration. An alternative approach is for the data provider to encrypt the data D using a public base key associated with each of the trusted authorities, decryption of the encrypted item only being possible by obtaining a decryption sub-key from the trusted delegate entity acting for each trusted authority in turn. This can be expressed as:

Encryption: ciphertext=$E(K\_all, data)$

Decryption: data =$D(K\_all, ciphertext)$ where K_all is encryption key related to all trusted authorities, K'_all is the corresponding decryption; key K'_all is retrieved from all decryption sub-keys. Further information about how multiple trusted authorities can be used is given in:

Chen L., K. Harrison, A. Moss, N. P. Smart and D. Soldera. "Certification of public keys within an identity based system" *Proceedings of information Security Conference* 2002, ed. A. H. Chan and V. Gligor, LNCS 2433, pages 322-333, Springer-Verlag, 2002.

The invention of claimed is:

1. A security method, carried out by a trusted authority entity, for generating decryption keys for multiple individuals, the method comprising:
    (a) receiving biometric data of a specific individual,
    (b) comparing the biometric data with biometric characteristics of a subject individual to determine whether the latter is said specific individual, and
    (c) using at least the biometric data and private data of the trusted authority entity to generate, by an identifier-based cryptography process, a decryption key that forms one key of an asymmetric key pair, and
    (d) repeating (a) to (c) for each of multiple specific individuals, the same trusted-authority private data being used in generating each decryption key.

2. A method according to claim 1, wherein the decryption key is made available to the subject individual only if the latter is determined by the trusted authority entity to be said specific individual.

3. A method according to claim 1, wherein the decryption key is used by the trusted authority entity to decrypt data that has been encrypted based on encryption parameters comprising public data of the trusted authority entity and an encryption key string formed using at least said biometric data, said public data of the trusted authority entity being related to its private data.

4. A method according to claim 3, wherein the decrypted data is made available to the subject individual if the latter is determined by the trusted authority entity to be said specific individual.

5. A method according to claim 1, wherein if the subject individual is determined by the trusted authority entity to be the specific individual, the decryption key is used by the trusted authority entity to decrypt data that has been encrypted based on encryption parameters comprising public data of the trusted authority entity and an encryption key string formed using at least said biometric data, said public data of the trusted authority entity being related to its private data.

6. A method according to claim 1, wherein the generation of the decryption key is only carried out if said subject individual is determined to be said specific individual.

7. A method according to claim 1, wherein the subject individual is a human person that has presented him/herself to the trusted authority entity and purports to be said specific individual.

8. A method according to claim 1, wherein the determination of whether said subject individual is said specific individual is carried out automatically by comparing features represented in the reference biometric data with features in measurement data produced by measurement of the subject individual.

9. A method according to claim 1, wherein the determination of whether said subject individual is said specific individual is carried out by a human.

10. A method according to claim 1, wherein the biometric data comprises image data of the face of the specific individual.

11. A method according to claim 1, wherein the biometric data is read from a memory device presented by the subject individual.

12. A method according to claim 1, wherein the generation of the decryption key is effected in accordance with identifier-based cryptography utilising quadratic residuosity.

13. A method according to claim 1, wherein the generation of the decryption key is effected in accordance with identifier-based cryptography utilising Weil or Tate pairings.

14. A data access control method comprising:
(a) encrypting first data using encryption parameters comprising public data of a trusted authority entity and an encryption key string formed using at least biometric data of a specific individual;
(b) providing the biometric data of said specific individual to the trusted authority entity which uses it both:
as a biometric reference for comparison with biometric characteristics of a subject individual to determine whether the latter is said specific individual, and
to generate, by an identifier-based cryptography process, a decryption key that forms one key of an asymmetric key pair and that is based on at least the biometric data and private data of the trusted authority entity, said public data of the trusted authority entity being related to its private data;
(c) using the decryption key to decrypt the encrypted first data; and
(d) repeating (a) to (c) for each of multiple specific individuals, the same trusted-authority private data being used in generating each decryption key.

15. A method according to claim 14, wherein the decryption key is only generated, or only made available for use in step (c), by the trusted authority entity if the subject individual is determined by the trusted authority entity to be the specific individual.

16. A method according to claim 14, wherein in step (a) the biometric data of said specific individual is contemporaneously generated from said specific individual.

17. A method according to claim 14, wherein in step (a) the biometric data of said specific individual is generated from recorded analogue biometric data of said specific individual.

18. A method according to claim 14, wherein in step (a) biometric data of said specific individual is retrieved from digital storage.

19. A method according to claim 18, wherein the biometric data of said specific individual is retrieved from a memory device presented by said specific individual.

20. A method according to claim 14, wherein the biometric data of said specific individual is provided to the trusted authority entity by being read off a memory device presented by said subject individual.

21. A method according to claim 14, wherein the biometric data of said specific individual is provided to the trusted authority entity by transfer from an entity carrying out step (a).

22. A method according to claim 14, wherein the subject individual is a human person that has presented him/herself to the trusted authority entity and purports to be said specific individual.

23. A method according to claim 14, wherein in step (b) the determination of whether said subject individual is said specific individual is carried out automatically by comparing features represented in the reference biometric data with features in measurement data produced by measurement of the subject individual.

24. A method according to claim 14, wherein in step (b) the determination of whether said subject individual is said specific individual is carried out by a human.

25. A method according to claim 14, wherein step (c) is carried out by the trusted authority entity and the decrypted data is made available to the specific individual.

26. A method according to claim 14, wherein the trusted authority entity provides the decryption key to said specific individual which then carries out step (c).

27. A method according to claim 14, wherein the biometric data of said specific individual comprises image data of the face of the specific individual.

28. A method according to claim 14, wherein in step (a) the biometric data of said specific individual is read from a memory device of said specific individual and the encrypted first data is stored to said device, the biometric data of said specific individual being provided to the trusted authority entity in step (b) by being read from said memory device, and step (c) being carried by the trusted authority entity and only if the subject individual is determined in step (b) to be said specific individual, the decrypted first data produced in step (c) being made available to said specific individual.

29. A method according to claim 28, wherein the first data comprises password data.

30. A method according to claim 14, wherein step (a) is carried out by a data provider with the biometric data of said specific individual being image data derived from a photograph of said specific individual, the biometric data of said specific individual being sent to a receiving party together with the encrypted first data for use by the trusted authority entity in step (b).

31. A method according to claim 30, wherein the receiving party is the trusted authority entity.

32. A method according to claim 30, wherein the receiving party is said specific individual.

33. A method according to claim 14, wherein step (a) is carried out by a data provider with said biometric data of said specific individual comprising data that is the same as biometric data stored on a memory device of said specific individual as a result of having been either read from that device or provided from a common source, the said subject individual seeking to obtain the decryption key from the trusted authority entity by presenting a memory device to the trusted authority entity to enable the latter to read off biometric data stored in the device, the trusted authority entity providing the decryption key to the subject individual only if the latter is determined in step (b) to be said specific individual.

34. A method according to claim 33, wherein the encryption key string includes a data element known to the data provider and passed to the trusted authority entity, this data element being varied between iterations of steps (a) to (c).

35. A method according to claim 14, wherein the cryptographic processes involving the encryption key string and decryption key are effected in accordance with identifier-based cryptography utilising quadratic residuosity.

36. A method according to claim 16, wherein the cryptographic processes involving the encryption key string and decryption key are effected in accordance with identifier-based cryptography utilising Weil or Tate pairings.

* * * * *